United States Patent [19]
Vogel

[11] Patent Number: 6,135,777
[45] Date of Patent: Oct. 24, 2000

[54] EVENT LOGGING SYSTEM

[76] Inventor: Peter S. Vogel, 28 Adeline St., Faulconbridge NSW 2776, Australia

[21] Appl. No.: 08/988,351

[22] Filed: Dec. 10, 1997

Related U.S. Application Data

[60] Division of application No. 08/484,898, Jun. 7, 1995, Pat. No. 5,795,161, which is a continuation-in-part of application No. 07/684,894, May 29, 1992, Pat. No. 5,453,015.

[30] Foreign Application Priority Data

Oct. 20, 1988 [AU] Australia ............................... PJ 1083
Oct. 20, 1989 [AU] Australia ................ PCT/AU89/00457

[51] Int. Cl.[7] .................................................. G09B 3/00
[52] U.S. Cl. .......................... 434/350; 434/118; 434/323
[58] Field of Search ..................................... 434/118, 169, 434/322, 307 R, 323, 335, 350, 362, 365; 702/182; 345/352, 356, 146, 326; 706/427; 704/4; 707/532; 368/28, 62, 89, 107, 108

[56] References Cited

U.S. PATENT DOCUMENTS

| | | |
|---|---|---|
| 3,718,759 | 2/1973 | Reiffel . |
| 3,771,240 | 11/1973 | Matui . |
| 3,934,226 | 1/1976 | Stone et al. . |
| 4,121,355 | 10/1978 | Kimoto et al. . |
| 4,122,498 | 10/1978 | Dyer . |
| 4,377,870 | 3/1983 | Anderson et al. . |
| 4,449,830 | 5/1984 | Bulgier . |
| 4,518,361 | 5/1985 | Conway . |
| 4,559,636 | 12/1985 | Goldrian . |
| 4,584,602 | 4/1986 | Nakagawa . |
| 4,622,013 | 11/1986 | Cerchio . |
| 4,651,299 | 3/1987 | Miyazaki et al. . |
| 4,745,468 | 5/1988 | Von Kohorn . |
| 4,809,013 | 2/1989 | Cho . |
| 4,872,121 | 10/1989 | Chan et al. ............................. 702/182 |
| 4,926,255 | 5/1990 | Von Kohorn . |
| 4,982,642 | 1/1991 | Nishikawa et al. . |
| 5,027,297 | 6/1991 | Garitty et al. . |
| 5,033,969 | 7/1991 | Kamimura . |
| 5,049,873 | 9/1991 | Robins et al. . |
| 5,097,470 | 3/1992 | Gihl . |
| 5,176,520 | 1/1993 | Hamilton . |
| 5,211,564 | 5/1993 | Martinez et al. . |
| 5,240,419 | 8/1993 | deGyarfas . |
| 5,273,437 | 12/1993 | Caldwell et al. . |
| 5,294,229 | 3/1994 | Hartzell et al. . |
| 5,453,015 | 9/1995 | Vogel ...................................... 434/350 |
| 5,496,177 | 3/1996 | Collia et al. ......................... 434/323 X |
| 5,588,009 | 12/1996 | Will . |
| 5,601,432 | 2/1997 | Bergman .............................. 434/365 X |
| 5,601,436 | 2/1997 | Sudman et al. ..................... 434/350 X |
| 5,795,161 | 8/1998 | Vogel ...................................... 434/350 |
| 5,827,070 | 10/1998 | Kershaw et al. .................... 434/350 X |
| 5,868,576 | 2/1999 | Maruta ................................ 434/118 X |
| 5,890,905 | 4/1999 | Bergman ................................. 434/118 |

FOREIGN PATENT DOCUMENTS

| | | |
|---|---|---|
| 0010794 | 5/1980 | European Pat. Off. . |
| 0214315 | 3/1987 | European Pat. Off. . |
| 2520180 | 7/1983 | France . |
| 59-086341 | 5/1984 | Japan . |
| 2148675 | 5/1985 | United Kingdom . |
| 2184029 | 6/1987 | United Kingdom . |
| 86-02753 | 5/1986 | WIPO . |
| 86-07277 | 12/1986 | WIPO . |
| 90-04439 | 5/1990 | WIPO . |

OTHER PUBLICATIONS

Patent Abstracts of Japan, Abstract vol. 008198, Nov. 9, 1994 (JP 59086341, May 18, 1984).

*Primary Examiner*—Joe H. Cheng
*Attorney, Agent, or Firm*—Pillsbury Madison & Sutro LLP

[57] ABSTRACT

An event logging system in which logged events are time stamped by storing a value read from a counter which is incremented at an arbitrary but consistent rate. When the data is recalled for analysis, the actual time of the event is calculated by reading the current value of the counter, reading the stored counter values associated with logged events, measuring the period of the clock incrementing the counter, and then using this information to calculate the absolute time.

3 Claims, 3 Drawing Sheets

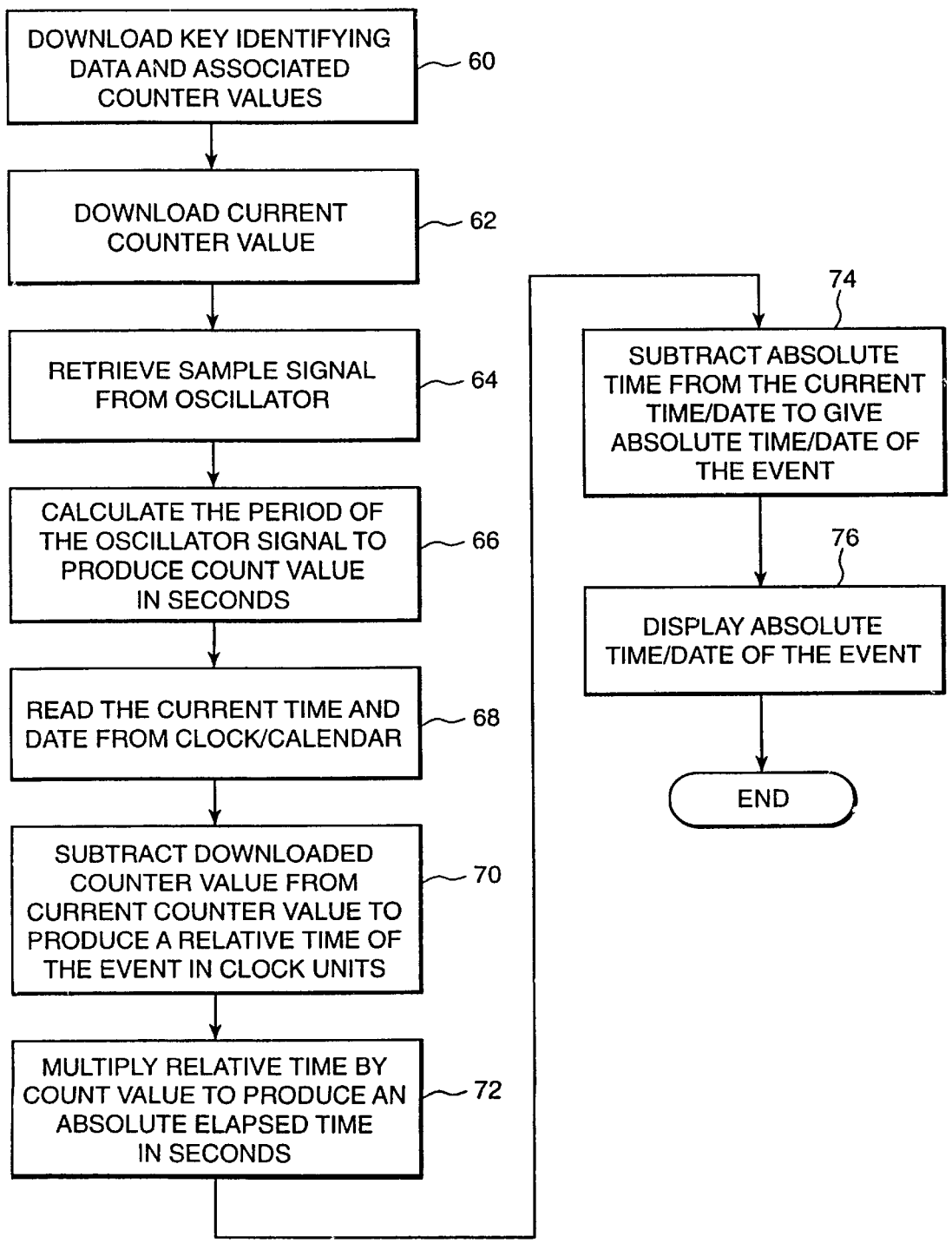

EVENT LOGGING SYSTEM

RELATED APPLICATIONS

This application is a division of U.S. patent application Ser. No. 08/484,898, filed Jun. 7, 1995 now U.S. Pat. No. 5,795,161, which is a continuation-in-part of U.S. patent application Ser. No. 07/684,894, filed May 29, 1992 now U.S. Pat. No. 5,453,015.

BACKGROUND OF THE INVENTION

1. Field of the Invention

The present invention relates to methods of, and means for recording and recalling timing information and identifying information related to events.

2. Description of the Related Art

Event logging systems are used to record information over a period of time for retrospective analysis. Such systems comprise some form of memory into which data corresponding to input signals are stored along with information identifying the time of the event. When it is desired to analyze the logged data, the event identifying and timing information is recalled and processed.

An example of such a logging system is a game playing device which records player responses along with the time at which the response was made. Such a device might include three pushbuttons, labelled "A", "B", "C", a clock/calendar device and digital memory arranged so that when one of the buttons is pressed, data identifying which button was pushed as well as the current time/date are stored in memory. This allows the device to be used for playing a quiz game. As the responses to multiple-choice questions are stored along with the time the response was made, the information can subsequently be recalled from memory for score calculation. The timing information is required to ensure that the responses were made during the time window allowed for response, and also for correlating the responses with questions.

In prior art logging systems, timing information is provided by a clock/calendar system typically comprising a stable oscillator driving suitable counting/calculating means. So that the timing information recorded is accurate, the oscillator must be stable and set to the exact frequency required and the time/date must be correctly set before logging begins. Logged information can be incorrectly time-stamped if, for example, the frequency of the oscillator is incorrectly set or the wrong time or date has been set.

SUMMARY OF THE INVENTION

It is an object of the present invention to provide an improved logging system which does not require the time and date to be set in advance of recording data and which can provide correct timing information without needing the oscillator to be set to a particular frequency.

According to a first aspect of the present invention there is provided a method of logging events comprising the steps of receiving a signal marking an event to be logged and storing in memory means a first timer value being the instantaneous value stored in a counter which is incremented at regular intervals. The rate of incrementing of said counter is arbitrary but consistent, and the absolute value of the counter does not have a particular relationship with the time of day or date. This aspect of the invention also includes the method of recalling the logged information which further comprises the steps of recalling from said memory means said first timer value, receiving from said counter a second timer value representing the count at the moment of recalling said first timer value, subtracting said first timer value from said received second timer value to calculate a third value being the difference in time between the time of the event and the time of recall, receiving a signal oscillating with a period equal to the interval at which said counter is being incremented, measuring the period of said oscillating signal in absolute units to calculate a fourth value being the value of each time interval counted, multiplying the calculated third value by the fourth value to give a relative time value in absolute units, and subtracting said relative time value from the time of day and date at which the recall is performed. The result of this last step is the time and date at which the event occurred.

According to another aspect of the present invention, the method is extended to provide means for logging a number of events by storing multiple counter values in different locations of memory means, each being associated with another event.

A further aspect of the invention extends the inventive concept to provide a method of logging a number of different types of event by storing, for each event logged, data indicative of an event type, as well as the associated counter value.

The invention also consists in means for carrying out the methods disclosed above.

BRIEF DESCRIPTION OF THE DRAWINGS

An embodiment of the invention will now be described with reference to the drawing in which

FIG. 3 is a flowchart illustrating the data retrieval process.

DETAILED DESCRIPTION OF THE PRESENTLY PREFERRED EXEMPLARY EMBODIMENT

Figure 1:
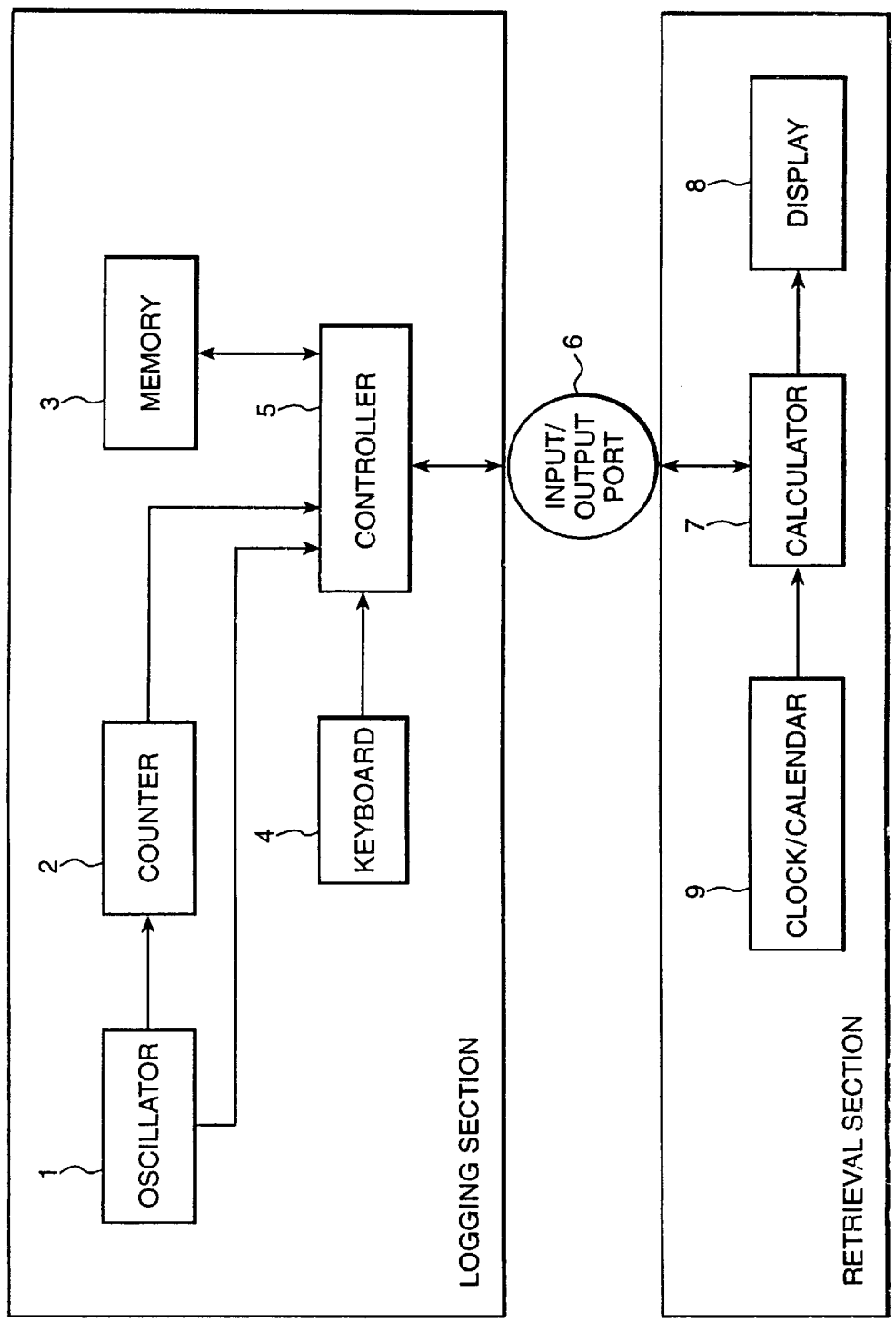
FIG. 1 is a block diagram of an event logger suitable for use in recording and recalling responses to a quiz game.

The embodiment of the present invention illustrated in FIG. 1 can be used to allow a player to enter responses to multiple-choice questions posed by pressing one of six buttons when a question is asked. Information is stored identifying which button was pressed along with timing information related to the response. The time information can be compared to the time and date at which the corresponding question was asked or broadcast. This enables television audiences, for example, to participate in a quiz show while guarding against cheating or to weight scores according to response time.

Referring to FIG. 1, the invention comprises two subsystems which can be disconnected from each other during event logging and connected together when it is desired to retrieve logged information. In practice, a number of devices comprising the logging section can be provided so that many players can play the game at the same time. The logging section can subsequently be connected to the calculating section for data retrieval. The point of disconnection is input/output port 6.

Figure 2:
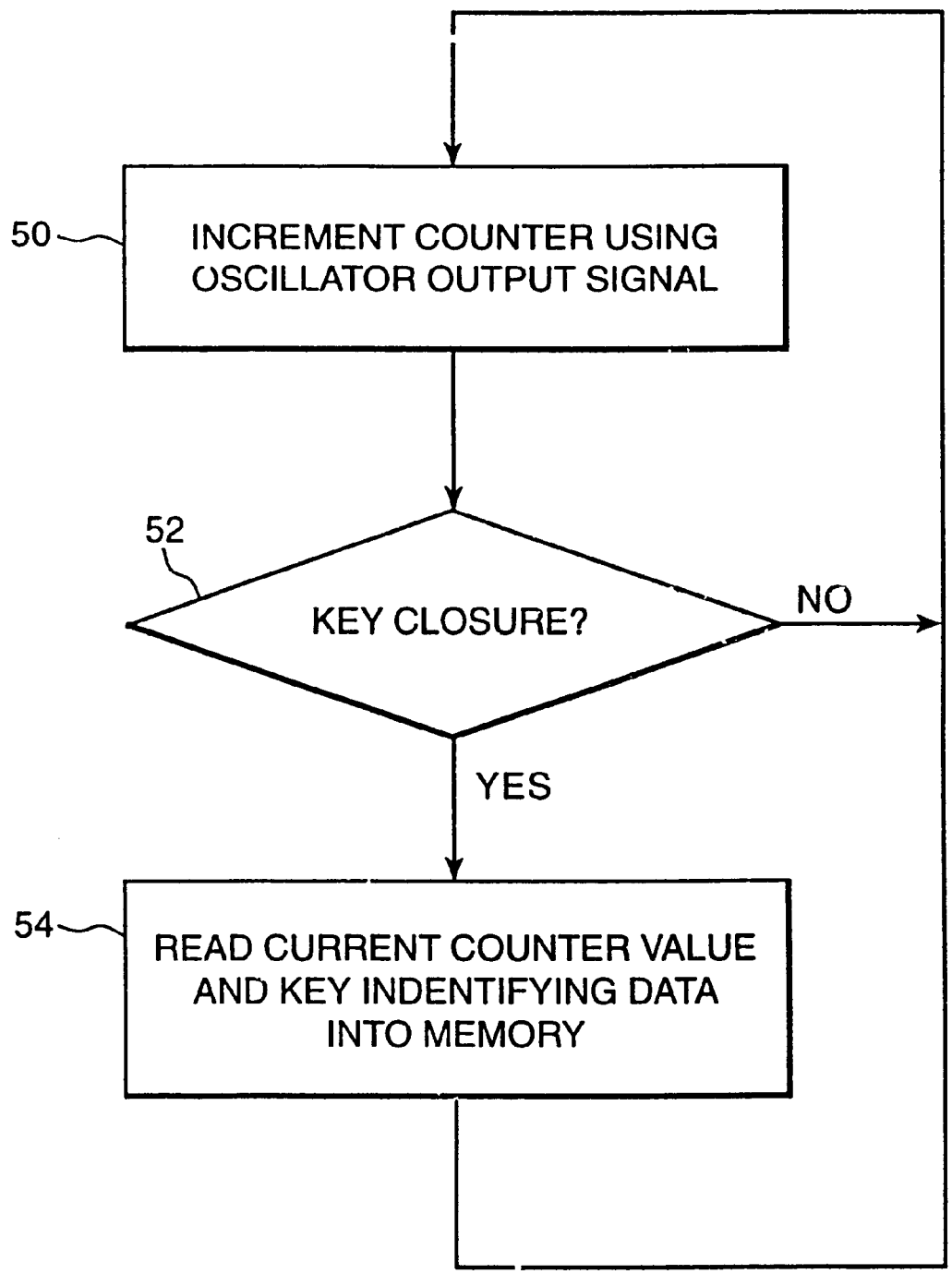
FIG. 2 is a flowchart illustrating the data recording process.

Operation of the logging section of the invention will now be described with reference to FIGS. 1 and 2. Oscillator 1 is a crystal controlled oscillator which runs continuously. The particular frequency of oscillation is not relevant to the operation of the invention, so it is not necessary to adjust the frequency as a manufacturing step. Oscillator 1 of this embodiment also includes a divider chain which reduces the output frequency to approximately 1 Hz. Counter 2 is a 24 bit counter clocked by the output of oscillator 1, so that it counts approximately in seconds. See step 50 in FIG. 2. Counter 2 counts continuously, from the time power is applied. Keyboard 4 accepts input from the player. When a question is asked, the player responds by pressing one of the six keys. Controller 5 senses the key closure (step 52), reads the value of counter 2, and writes it to a location in memory 3, along with further data identifying which key was pressed (step 54). Subsequent key presses cause counter values and key identification data to be written to sequential memory locations.

Operation of the retrieval section will now be described with reference to FIGS. 1 and 3. When the game is complete, the logged information can be retrieved for analysis. First, calculator 7 is connected to controller 5 via input/output port 6. Calculator 7 then sends a signal to controller 5 which causes controller 5 to read the contents of memory 3 and transmit the key identifying data and associated counter values to calculator 7. See step 60 in FIG. 3. Calculator 7 then requests that controller 5 interrogate counter 2 and send the current value to calculator 7. See step 63 in FIG. 3. Calculator 7 then requests that controller 5 send a sample of the output of oscillator 1 to calculator 7. See step 64 in FIG. 3. Calculator 7 then carries out the following calculations:

1. The period of the output of oscillator 1 is calculated to give the value of each count in seconds (step 66);
2. Calculator 7 reads the current time/date from clock/calendar 9 (step 68); and
3. For each event recalled:
   i) the counter value is subtracted from the current counter value received, to yield the relative time of the event (in clock units) (step 70);
   ii) the relative time is multiplied by the value of each count previously calculated to give the absolute elapsed time (in seconds) (step 72); and
   iii) the absolute time is subtracted from the current time/date to give the absolute time and date of the event (step 74).

Calculator 7 then displays, on display 8, a table identifying for each event which key was pressed and the time and date that it was pressed (step 76). This table can then be used to score the game by observing which key was pressed in response to each question asked. The term "score" as used herein refers to the result of comparing a recorded response and a preferred response or any tabulation or statistical analysis of responses.

The foregoing describes only one embodiment of the invention, and modifications obvious to those skilled in the art can be made without departing from the scope of the invention. For example, whereas in the embodiment described the timing means is continuously running, it is envisaged that the timing means could begin running when a first response is sensed, or operate continuously from, for example, the time of sale of the device, or the time of insertion of batteries. The means for recalling stored responses and timing information described in relation to the embodiment above is also only one example of suitable means and method. For example, instead of connecting the logging device to the recalling device by means of an electrical connector, it is envisaged that the information could be transferred by other means, such as an optical or acoustic coupler or by physically transferring a storage medium, such as a solid state device or floppy disk, from the logging device to the recalling/calculating device.

Furthermore, although the embodiment of the invention is described herein as being practiced using discrete electronic elements, a variety of other techniques can be used with good results. For example, the functions required can be economically achieved using a suitably-programmed microprocessor or an application-specific integrated circuit.

What is claimed is:

1. An event logging system, said event logging system comprising:
   a logging section, said logging section including:
      an oscillator for providing a clock signal having a first frequency,
      a counter receiving said clock signal from said oscillator for counting in increments of approximately one second based on said clock signal and providing a count signal indicative of a current count value,
      a controller having a first input portion for receiving said count signal and a second input portion,
      a keyboard for providing an input signal to said second input portion of said controller, wherein said controller, upon receiving said input signal from said keyboard, reads said count signal from said counter to establish said current count value associated with said input signal received from said keyboard, and
      a memory for storing said input signal from said keyboard and said current count value associated with said input signal received from said keyboard; and
   a retrieval section, said retrieval section including:
      a clock/calender unit for providing a signal indicative of a current time and date, and
      a calculator, said calculator being adapted to:
         a) receive said current count value associated with said input signal entered via said keyboard,
         b) receive a first value representing a current count of said counter,
         c) subtract said current count value associated with said input signal from said first value representing said current count of said counter to determine a second value,
         receive said clock signal output from said oscillator,
         measure an absolute time period of said clock signal to determine a clock period of said clock signal,
         multiply said second value by said clock period to provide an absolute elapsed time,
         receive said signal indicative of said current time and date from said clock/calender unit, and
         subtract said absolute elapsed time value from said current time and date to provide an absolute event time.

2. The event logging system as claimed in claim 1, said event logging system further comprising:
   a display unit for displaying a table, said table including:
      information indicative of an entry entered via said keyboard based on said input signals, and
      an absolute event entry time at which said entry was entered based on said absolute event time.

3. The event logging system as claimed in claim 1, said event logging system further comprising:
   an electronic coupling device for connecting said logging section to said retrieval section.

* * * * *